(12) United States Patent
Veivers et al.

(10) Patent No.: US 7,537,043 B2
(45) Date of Patent: May 26, 2009

(54) FRAME ASSEMBLY

(76) Inventors: Bradley Mark Veivers, 71 Tulip Lane, Buderim, Queensland (AU) 4556; John Bernard Hynes, 22 Whitehaven Drive, Buderim, Queensland (AU) 4556

( * ) Notice: Subject to any disclaimer, the term of this patent is extended or adjusted under 35 U.S.C. 154(b) by 388 days.

(21) Appl. No.: 11/435,141

(22) Filed: May 17, 2006

(65) Prior Publication Data
US 2006/0201350 A1   Sep. 14, 2006

(51) Int. Cl.
*A47B 5/00* (2006.01)

(52) U.S. Cl. ...................... 160/380; 160/371
(58) Field of Classification Search ................ 160/371, 160/380, 391, 392, 395; 52/656.5, 656
See application file for complete search history.

(56) References Cited

U.S. PATENT DOCUMENTS

| | | | | | |
|---|---|---|---|---|---|
| 1,561,877 | A | * | 11/1925 | Martin | 160/381 |
| 2,335,361 | A | * | 11/1943 | Schiller | 160/395 |
| 2,791,004 | A | * | 5/1957 | Sullivan | 52/204.55 |
| 6,802,357 | B2 | * | 10/2004 | Taylor et al. | 160/371 |

* cited by examiner

*Primary Examiner*—Blair M. Johnson
(74) *Attorney, Agent, or Firm*—Young & Thompson

(57) ABSTRACT

A frame assembly is made up of a number of strips and a frame member, which has a channel defined by side walls and a bottom wall. A first strip located in the channel has a terminal end section defined by a return flange so that the terminal end section surrounds the peripheral edge of a rigid stainless-steel screen. The wall has projections and recesses which cooperate with respective recesses and projections in the first strip to position the first strip and inhibit its removal. A locking strip and the wall have cooperating oppositely directed teeth to drive the locking strip into position and prevent its removal without destroying the teeth. Both strips have a screen contact region made up of ridges. The first strip is made from soft PVC while the second strip is made from rigid PVC or a co-extrusion being softer on the screen contact side.

15 Claims, 4 Drawing Sheets

FRAME ASSEMBLY

FIELD OF THE INVENTION

THIS INVENTION relates to frame assembly for a planar sheet of material and in particular but not limited to a frame assembly when used in a security screen assembly. Screen as used herein refers to any planar sheet including sheets with or without holes.

BACKGROUND TO THE INVENTION

The vast majority of insect screens, security screens and the like, employ a hollow extruded frame having a channel in which an edge of the screen is secured.

Some arrangements employ a ratchet type mechanism to secure the screen in place and in some cases also apply tension. Australian patent application 78780/98 to Rezon Pty Ltd describes a security screen where a rigid mesh has an edge flange folded back at an acute angle forming a V-shaped edge in section. This edge is inserted into a channel in a frame with ribs forming shoulders extending along one wall of the channel. When the V-shaped screen edge is inserted into the channel, the flange rides over the ribs and then springs back with the edge of the flange retained behind one of the shoulders. A V-shaped filler strip is inserted into the channel behind the flange. This is a simple arrangement and separate fasteners are not required. Australian patent application No 200037825 to W.A. Security Products Pty Ltd describes a security screen where the screen edge has a 90° flange and a locking strip holds the edge in a channel of a frame. A ratchet type arrangement is employed where the locking strip is pushed into the channel behind the screen flange, the locking strip has teeth which jump over teeth on one channel wall in ratchet fashion while teeth on the other channel wall are urged into apertures in the screen. This arrangement utilises some of the principles of 78780/98 but introduces a locking member effectively operating similar to the acutely angled flange. Again there are no conventional fasteners used.

Other arrangements use conventional fasteners. Australian patent application No 25039/93 to Pepperell et al describes a security screen where a screen edge portion is clamped using spaced fasteners and a clamping strip the fasteners passing through the clamping strip, screen and opposite side frame member. Australian patent application No 25040/95 uses spaced rivets and a clamping strip to secure the screen in a frame. Australian patent application No 68121/96 uses spaced rivets which pass into screen apertures and block removal of the screen but the fasteners don't pass all the way though the screen.

Other arrangements employ a combination of wedge, clamp and/or ratchet type methods to secure the screen in a frame. Australian patent application No 71855/98 employs a frame having a channel which is dovetail shaped in cross-section, a slotted insert having inter-digital ribs on opposite walls of the slot fits into the channel and when an edge portion of the screen is pushed into the insert, the insert expands against the dovetail and the screen is held by the ribs. WO9942694 to Security Investments Pty Ltd is similar to 71855/95 except instead of dovetail channel, the channel has teeth on opposite walls and the slotted insert has teeth on outer walls so that there is a combination of the expandable insert and a ratchet used.

Other arrangements use a hand insertable snap-on clamp. Australian patent application No 2003244563 to Moonbush Pty Ltd utilises an L-shaped clamp which snaps into a frame, a settable material surrounds a marginal edge portion of the screen and the screen and settable material sandwiched between the frame and the clamp.

Australian patent No 776083 to Reid describes various screen securing methods whereby a straight screen edge is sandwiched between two parts, a third element is used to urge the two sections to apply force to the screen. This third element may employ a ratchet arrangement, a screw fastener or a wedge or a combination of these. The third element acts on the screen indirectly through one or both of the two parts.

There are a host of solutions to the problem of securing a screen in a channel. The art is clearly a crowded one. In one case the screen is clamped, in another case spaced fasteners are used, in still other cases a fastenerless arrangement is used and still further various combinations of ratchet type arrangements, fasteners and clamps are employed.

All these arrangements have been used commercially with varying levels of success and reliability. Each has its own form of complexity both in construction and installation requirements. Consequently, it is an object of the present invention to at least provide a useful alternative to the prior art and more particularly in the applicant's view a simpler arrangement both in terms of manufacture and installation, the present case simplicity being an inventive element in the combination claimed in an otherwise crowded art.

OUTLINE OF THE INVENTION

In one broad form the present invention resides a screen assembly comprising a screen mounted in a surrounding frame assembly, the frame assembly in a screen mounted in a surrounding frame assembly, the frame assembly having a channel with an end wall and opposed side walls, a marginal edge section of the screen adjacent a peripheral edge of the screen being secured in the channel, the frame assembly having first and second channel insert strips adapted to be inserted into the channel in turn one before and one after the screen resulting in the marginal edge section of the screen being sandwiched between the strips, the first strip being located in the channel against one of the side walls, the first strip and the said one of the side walls having co-operating locating means, the first strip having a terminal edge section located adjacent the end wall of the channel between the end wall and the edge of the screen, the second strip being located in the channel after the edge of the screen is located in position adjacent the first strip, the second strip being a locking strip forced into the channel and directly engaging the screen, the relative dimensions of the channel, the strips and the screen being so selected such that as the locking strip is forced into its operative position in the channel the marginal edge section of the screen is secured in the channel between the strips.

The terminal edge section of the first strip preferably extends across the end wall of the channel as a flange and the edge of the screen abuts the flange. The second strip preferably is driven into the channel and retained by co-operating teeth on the second strip and on the adjacent side wall of the channel. Preferably, the second strip has a terminal edge that locates adjacent the edge of the screen when the second strip is in operative position. Preferably, the terminal edge section of the first strip, the terminal edge of the second strip and the edge of the screen are all located together in the bottom of the channel so that the strips and screen together fill the channel. In this embodiment the terminal end section of the first strip preferably has a flange and return flange forming a slot and the locking strip is positioned in the plane of the return flange.

In one preferred aspect the present invention resides in a frame assembly having a channel and being able to secure a marginal end section of a screen in the channel, the frame assembly having first and second channel insert strips adapted to be inserted into the channel with the marginal edge of the screen sandwiched between the strips, the first strip being the first component located in the channel and having a terminal end section adapted to wrap around the edge of the screen, the second strip being located in the channel after the edge of the screen is located in the terminal end section of the first strip in the channel, the second strip being a locking strip forced into the channel, the relative dimensions of the channel, the strips and the screen being so selected such that as the locking strip is forced into its operative position in the channel the marginal edge section of the screen is secured in the channel.

The channel preferably includes channel wall projections and/or recesses that aid retention of the strips in the channel. The wall beside the locking strip preferably has non-return projections or teeth that bite into the locking strip or travel over corresponding oppositely directed teeth on the locking strip to prevent removal of the locking strip or to prevent any backward movement of the locking strip.

One or both strips may include a deformable screen contact region so that as the locking strip is pushed into position the deformable region is deformed so as to enter into screen openings in the screen and thereby apply tension to the screen. Preferably, the first strip is made from deformable material and the locking strip is made from rigid material. Consequently, as the locking strip is forced into position the first strip is duly deformed.

The screen contact region of one or both strips may include projections. Preferably the screen contact region includes a series of longitudinally extending ribs. Preferably, the first strip includes longitudinally extending screen engaging non-return ribs or the second strip includes longitudinally extending screen engaging non-return ribs. More preferably, the first and second strips include longitudinally extending screen engaging non-return ribs.

The terminal end section of the first strip typically comprises a channel formed by an end wall and a return flange. The locking strip is preferably pushed into position adjacent the return flange so that the marginal edge section of the screen is substantially surrounded by the assembled strips and spaced from the walls of the channel.

Preferably the screen material is made from rigid stainless-steel material or other rigid material. Preferably the first strip is made from a slightly soft PVC to allow a slight compression and the locking strip is preferably made from a rigid PVC. In another form the locking strip is a co-extrusion being softer on the screen contact side and rigid on the opposite side. The number and size of teeth is variable depending on what might be the preferred security requirements of strength and the like. Applicant has found that for a channel depth of approximately 20 mm and about 8 mm wide, about 6 to 8 teeth on the strips is adequate.

Typically, the co-operating locating means comprises spaced longitudinally extending grooves and projections, the first strip being generally L-shaped in cross-section and being placeable in the channel with the projections in register with the grooves by a sideways movement of the first strip across the channel. More specifically the co-operating locating means comprises spaced longitudinally extending grooves in one channel wall and corresponding projections in an adjacent wall of the first strip, the first strip being generally L-shaped in cross-section and being placeable in the channel with the projections in register with the grooves by a sideways movement of the second strip across the channel.

BRIEF DESCRIPTION OF THE INVENTION

In order that the present invention may be more readily understood and be put into practical effect reference will now be made to the accompanying drawings which illustrate preferred embodiments of the invention and wherein.

METHOD OF PERFORMANCE

Figure 1:
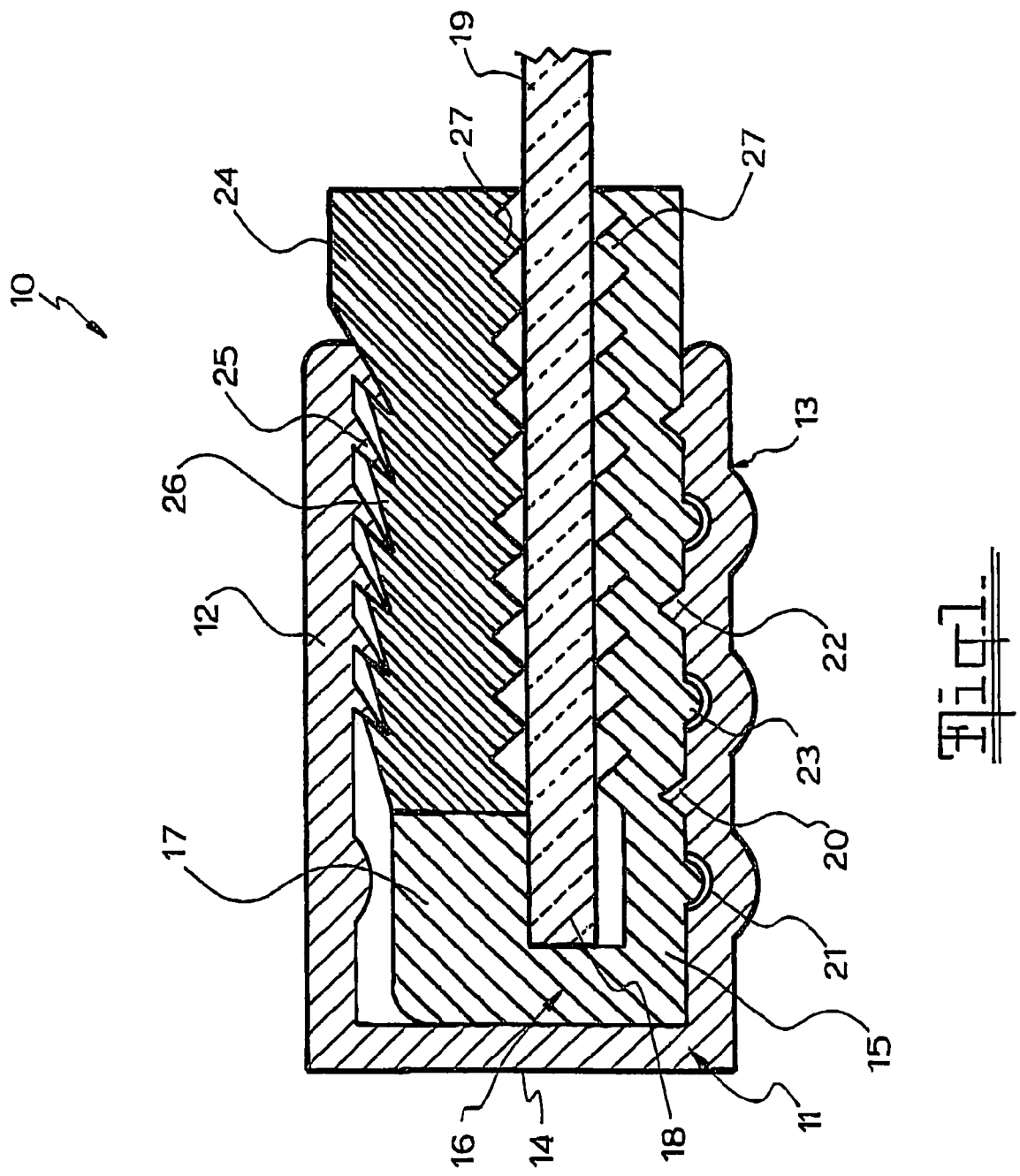
FIG. 1 is a section through a typical frame assembly.
Figure 2:
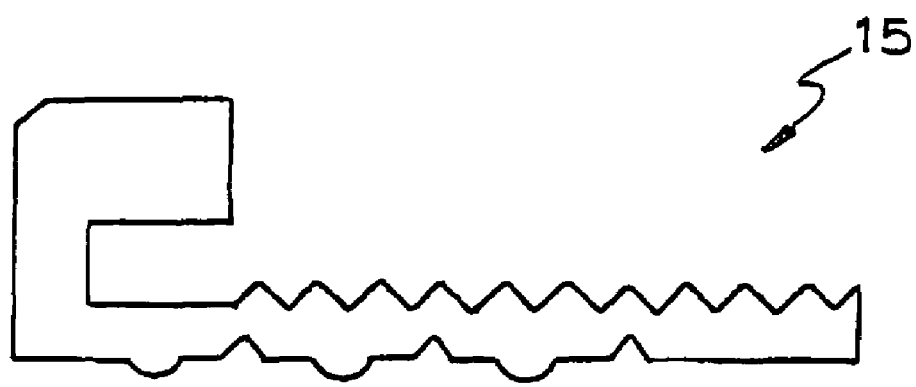
FIG. 2 and FIG. 3 are sections through typical strips.
Figure 3:
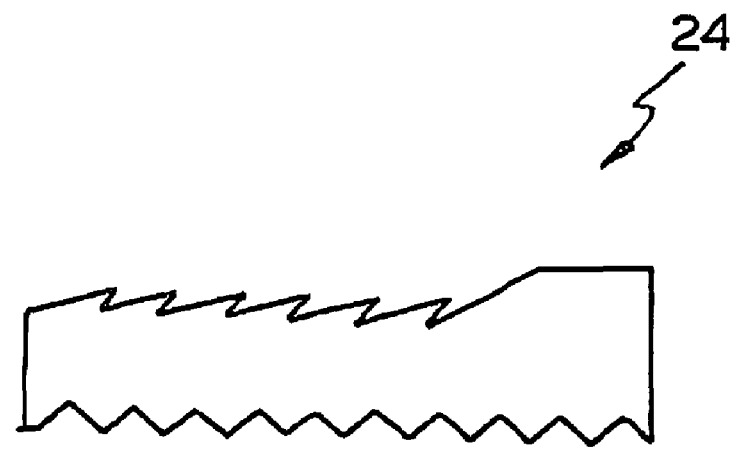

Referring to the drawings and initially to FIG. 1 there is illustrated a frame assembly 10 in section and it will be appreciated that the frame assembly is made up of a number of strips and an outer rail or frame member 11. The frame member 11 has a channel defined by side walls 12 and 13 and a bottom wall 14. A first strip 15 is located in the channel first, the first strip has a terminal end section 16 defined by a return flange 17 so that the terminal end section 16 surrounds the peripheral edge 18 of a rigid stainless-steel screen 19.

The wall 13 has projections 20 and recesses 21 which cooperate with respective recesses 22 and projections 23 in the first strip 15 to aid locating the first strip in position and inhibiting its removal. The second strip or locking strip 24 and the wall 12 have cooperating oppositely directed teeth 25 and 26 so that the locking strip 24 may be driven into position and cannot be removed without destroying the teeth 26. Both strips have a screen contact region made up of ridges 27. The strip 15 is made from soft PVC while the strip 24 is made from rigid PVC or a co-extrusion being softer on the screen contact side. The strip 15 is deformed in the contact region about the teeth 27 of the strip 15 and as the strip 24 is being driven into position the combined effect of deformation of the strip 15 and the cooperating teeth 25 and 26 a tension is applied to the screen.

Referring to FIGS. 4 to 7 there is illustrated various frame members 28, 29, 30 and 31 each of which have identical channels 32 corresponding to the channel of FIG. 1. The extrusions are used for different applications including doors and windows.

Figure 8:
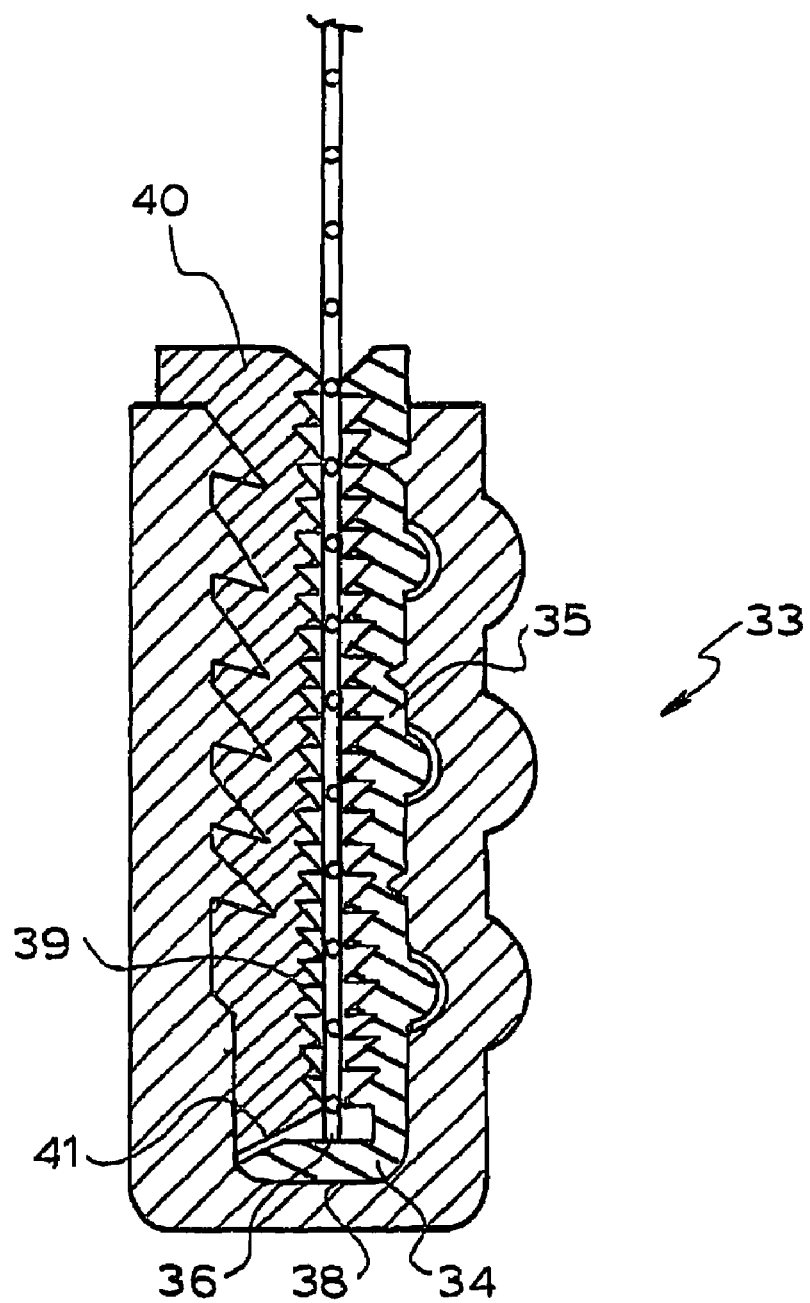
FIG. 8 is a cross-section through another embodiment.

Referring to FIG. 8, there is illustrated a further embodiment 33 where the terminal end section 34 of strip 35 is L-shaped wrapping around the edge 36 of the screen 37 so as to extend across the end wall 38 of channel 39. The strip 40 has its terminal edge 41 locating adjacent the edge 36 so that the two strips effectively encapsulate the marginal edge portion of the screen to a depth of about 20 mm. The strip 35 is semi-rigid and deformable. The screen side of strip 40 is semi-rigid and deformable whereas its outside is rigid thus providing a wedge action while deforming around the screen to enter the screen interstices.

In use and to construct an assembled screen frame assembly, the first strip, screen and second strip are inserted in turn in that order into the channel. This secures the extrusion to the screen edge and represents one edge of a screen assembly.

Figure 4:
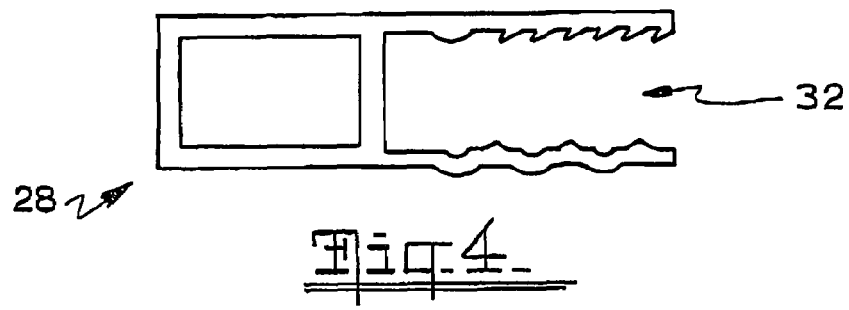
FIGS. 4 to 7 are sections through typical extruded hollow frame members which may be employed in a frame assembly according to the present invention.
Figure 5:
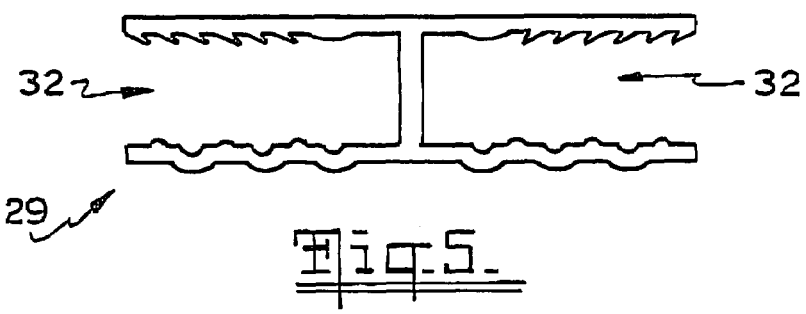
Figure 6:
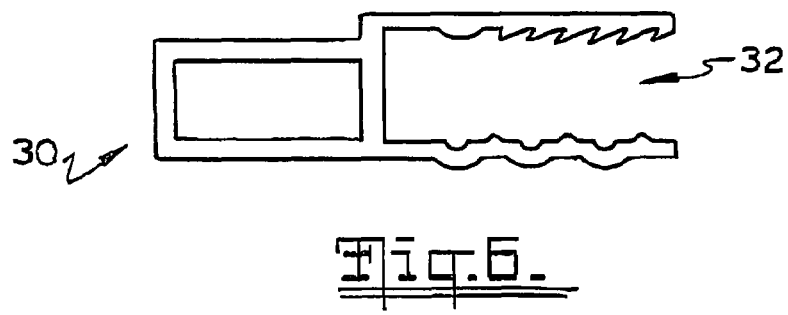
Figure 7:
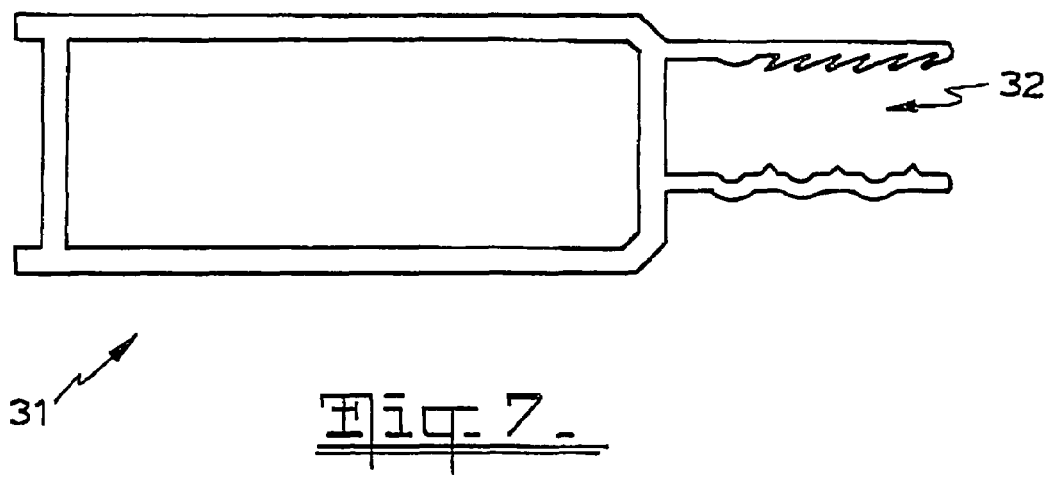

In order to make a rectangular screen three sides of a rectangular frame is constructed in the usual way from corner brackets and mitred lengths of the extrusions depicted in FIG. 4, 6 or 7 depending on the application of the invention to a window, door and so on. A fourth side is kept aside. The screen is cut to size. The partially completed frame is laid out flat and lengths of the first strip are inserted into the channel of the partially made frame. These strips could be inserted into individual sides before assembly and they could be individually applied to the screen. The screen is then inserted and laid flat on the first strip. The fourth side is then connected to complete the rectangular frame. Using a rubber mallet sections of the second strip are then driven into the channel flush with the channel edge to secure the screen in place.

Whilst the above has been given by way of illustrative example of the present invention many variations and modifications thereto will be apparent to those skilled now without departing from the broad ambit and scope of the invention as set out in the appended claims.

The invention claimed is:

1. A screen assembly, comprising:
a frame assembly; and
a screen mounted in the frame assembly, the frame assembly surrounding the screen and having a channel with an end wall and opposed side walls, a marginal edge section of the screen adjacent a peripheral edge of the screen being secured in the channel,
the frame assembly having first and second channel insert strips located in the channel with the marginal edge section of the screen being sandwiched between the strips,
the first strip being located in the channel against one of the side walls, the first strip and the said one of the side walls having co-operating locating means, the first strip having a terminal edge section located adjacent the end wall of the channel between the end wall and the edge of the screen, the second strip being located in the channel, and
the second strip being a locking strip directly engaging the screen,
wherein relative dimensions of the channel, the strips and the screen are configured such that the marginal edge section of the screen is secured in the channel between the strips,
wherein the first strip is al least deformable in part, and
wherein the locking strip is substantially rigid.

2. The screen assembly according to claim 1,
wherein the second strip has a terminal edge adjacent the edge of the screen, and
wherein the terminal edge section of the first strip, the terminal edge of the second strip, and the edge of the screen are all located together in the bottom of the channel so that the strips and screen together fill the channel.

3. The screen assembly according to claim 1, wherein the channel includes channel wall projections and/or recesses that aid retention of the strips in the channel.

4. The screen assembly according to claim 1, wherein a wall of the channel beside the locking strip has locking strip non-return projections.

5. The screen assembly according to claim 1, wherein at least one of said strips include a deformable screen contact region deformed into screen openings in the screen.

6. The screen assembly according to claim 1, wherein each strip includes a screen contact region, and
wherein the screen contact region of at least one of the strips include longitudinally extending projections.

7. The screen assembly according to claim 1, wherein the terminal end section of the first strip comprises a flange, the locking strip being in a position adjacent to the flange so that the marginal edge section of the screen is substantially surrounded by the assembled strips and spaced thereby from the walls of the channel.

8. The screen assembly according to claim 1,
wherein the screen is rigid,
wherein the first strip is comprised of a slightly soft PVC to allow a slight compression, and
wherein the locking strip is comprised of a rigid PVC.

9. The screen assembly according to claim 1,
wherein the locking strip has a screen contact side and an opposite side opposite the screen contact side, and
wherein the locking strip is a co-extrusion being softer on the screen contact side and rigid on the opposite side.

10. The screen assembly according to claim 1,
wherein the co-operating locating means comprises spaced longitudinally extending grooves in a first channel wall and corresponding projections in a wall of the first strip adjacent to the first channel wall, the first strip being generally L-shaped in cross-section and located in the channel with the projections in register with the grooves.

11. The screen assembly according to claim 1, wherein the terminal edge section of the first strip extends across the end wall of the channel as a flange, the edge of the screen abuts the flange, and the second strip is driven into the channel and retained by co-operating teeth on the second strip and an adjacent side wall of the channel,
the second strip having a terminal edge located adjacent the edge of the screen, and
the terminal edge section of the first strip, the terminal edge of the second strip, and the edge of the screen are all located together in the bottom of the channel so that the strips and screen together fill the channel.

12. The screen assembly according to claim 1, wherein the terminal edge section of the first strip extends across the end wall of the channel as a flange, the edge of the screen abuts the flange, and the second strip is driven into the channel and retained by co-operating teeth on the second strip and an adjacent side wall of the channel,
the second strip having a terminal edge located adjacent the edge of the screen position, and
the first and second strips including longitudinally extending screen engaging non-return ribs.

13. The screen assembly according to claim 1, wherein the terminal edge section of the first strip extends across the end wall of the channel as a flange, the edge of the screen abuts the flange, and the second strip is driven into the channel and retained by co-operating teeth on the second strip and an adjacent side wall of the channel,
the second strip having a terminal edge located adjacent the edge of the screen position,
the terminal edge section of the first strip, the terminal edge of the second strip, and the edge of the screen are all located together in the bottom of the channel so that the strips and screen together fill the channel, and
the first and second strips including longitudinally extending screen engaging non-return ribs.

14. The screen assembly according to claim 1, wherein the terminal edge section of the first strip extends across the end wall of the channel as a flange, the edge of the screen abuts the flange, and the second strip is driven into the channel and retained by co-operating teeth on the second strip and an adjacent side wall of the channel,
the second strip having a terminal edge that locates adjacent the edge of the screen,
the terminal edge section of the first strip, the terminal edge of the second strip, and the edge of the screen are all located together in the bottom of the channel so that the strips and screen together fill the channel,
the co-operating locating means comprised of spaced longitudinally extending grooves in a first channel wall and corresponding projections, in a wall of the first strip adjacent to the first channel wall, the first strip being generally L-shaped in cross-section and retained in the channel with the projections in register with the grooves, and the first and second strips including longitudinally extending screen engaging non-return ribs.

15. The screen assembly according to claim 1, wherein the terminal edge section of the first strip extends across the end wall of the channel as a flange, the edge of the screen abuts the flange, and the second strip is retained in the channel by co-operating teeth on the second strip and an adjacent side wall of the channel, the co-operating locating means comprising spaced longitudinally extending grooves in a first channel wall and corresponding projections, in a wall of the first strip adjacent to the first channel wall, the first being generally L-shaped in cross-section and retained in the channel with the projections in register with the grooves, and the first and second strips including longitudinally extending screen engaging non-return ribs.

\* \* \* \* \*